US012011095B1

(12) United States Patent
Shih

(10) Patent No.: US 12,011,095 B1
(45) Date of Patent: Jun. 18, 2024

(54) ELECTRIC BED HAVING VIBRATING MOTOR

(71) Applicant: Chuan-Hang Shih, Lukang Township, Changhua County (TW)

(72) Inventor: Chuan-Hang Shih, Lukang Township, Changhua County (TW)

( * ) Notice: Subject to any disclaimer, the term of this patent is extended or adjusted under 35 U.S.C. 154(b) by 0 days.

(21) Appl. No.: 18/222,777

(22) Filed: Jul. 17, 2023

(51) Int. Cl.
*A47C 21/00* (2006.01)
*A61H 23/02* (2006.01)

(52) U.S. Cl.
CPC ........... *A47C 21/006* (2013.01); *A61H 23/02* (2013.01); *A61H 2201/0134* (2013.01); *A61H 2201/0146* (2013.01)

(58) Field of Classification Search
CPC .................. A47C 21/006; A61H 23/02; A61H 2201/0134; A61H 2201/0146
See application file for complete search history.

(56) References Cited

U.S. PATENT DOCUMENTS 5,007,410 A * 4/1991 DeLaney ........... A61H 23/0263 5/915
5,437,607 A * 8/1995 Taylor .................... A61H 7/001 5/915
8,185,986 B2 * 5/2012 Grimes .................. A61H 1/005 5/915
9,788,660 B2 * 10/2017 Ermalovich ........... A61G 7/015
2002/0078503 A1 * 6/2002 Godette ................. A61G 7/002 5/915
2013/0025066 A1 * 1/2013 Shih ..................... A47C 21/006 5/694
2013/0085552 A1 * 4/2013 Mandel ................... A61F 7/007 607/99
2017/0348186 A1 * 12/2017 Garcia ................... A61H 23/02
2018/0353374 A1 * 12/2018 Shih ....................... A61H 1/005
2020/0189885 A1 * 6/2020 Li ............................. B66C 1/16
2020/0214460 A1 * 7/2020 Wang ................... A47C 21/006

FOREIGN PATENT DOCUMENTS

KR 20220061528 A * 11/2020

* cited by examiner

*Primary Examiner* — Tu A Vo
*Assistant Examiner* — Kelsey E Baller
(74) *Attorney, Agent, or Firm* — Birch, Stewart, Kolasch & Birch, LLP

(57) ABSTRACT

An electric bed includes a bed support, a cushion container, a vibrating motor, and a retaining belt. The bed support has a hollow portion. The cushion container includes a main body having a top portion received in the hollow portion, a chamber provided inside the main body, and at least one first heat dissipating hole communicated with the chamber to an ambient environment. The vibrating motor is disposed in the chamber of the cushion container. The retaining belt is disposed to the bed support and attached on a bottom edge of the cushion container to fix the cushion container to the bed support. As a result, the vibrating motor can be firmly mounted by a simple way to achieve convenient assembly, and the heat generated by the vibrating motor due to operation for a long period of time can be effectively dissipated.

5 Claims, 4 Drawing Sheets

ELECTRIC BED HAVING VIBRATING MOTOR

BACKGROUND OF THE INVENTION

1. Field of the Invention

The present invention relates generally to an electric bed and more particularly, to an electric bed having a vibrating motor.

2. Description of the Related Art

Conventional electric beds can adjust the inclined angles of the back and legs supporting parts in accordance with the user's needs. Over time, however, users have come to expect more and more functions from the electric beds. For example, they want electric beds to have massage functions. Therefore, electric beds equipped with vibrating motors on the bed support are now available commercially. With the vibrating motor, various massage effects to different parts of the user's body can be provided by vibration at different frequencies or amplitudes.

Due to the continuous vibrations generated by the vibrating motor, it has become a challenge for the industry to find a stable and convenient way to securely mount and install the vibrating motor. In another aspect, when the vibrating motor is in operation, to prevent the entire bed frame from vibration due to the direct transmission of the vibration to the bed support, foam materials are usually used to absorb the vibrations transmitted by the vibrating motor to the bed support. Although these foam materials can absorb vibrations, they also have the drawback of accumulating or insulating heat. As such, when the vibrating motor operates for a long period of time, the increase in temperature will not only affect the lifespan of the vibrating motor, but may also accelerate the ageing of the foam material, or the chemical substances in the foam material may be released to result in unpleasant odors. Therefore, finding a solution to enhance the heat dissipation of the vibrating motor is an issue to be solved by the industry.

SUMMARY OF THE INVENTION

The present invention has been accomplished in view of the above-noted circumstances. It is an objective of the present invention to provide an electric bed having a vibrating motor, in which the vibrating motor can be firmly mounted by a simple way, thereby achieving convenient installation.

It is another objective of the present invention to provide an electric bed having a vibrating motor, which can enhance the heat dissipation of the vibrating motor, thereby solving the overheat problem of the vibrating motor due to operation in a long period of time.

To attain the above objectives, the present invention provides an electric bed comprising a bed support, a cushion container, a vibrating motor, and a retaining belt. The bed support has a hollow portion. The cushion container includes a main body having a top portion received in the hollow portion, a chamber provided inside the main body, and at least one first heat dissipating hole communicated with the chamber to an ambient environment. The vibrating motor is disposed in the chamber of the cushion container. The retaining belt is disposed to the bed support and attached on a bottom edge of the cushion container to fix the cushion container to the bed support.

With the above-mentioned structural features, the vibrating motor can be firmly mounted by a simple way so as to achieve a convenient installation, and the heat generated by the vibrating motor due to use for a long period of time can be effectively dissipated to outside so as to improve the overheat problem of the vibrating motor.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
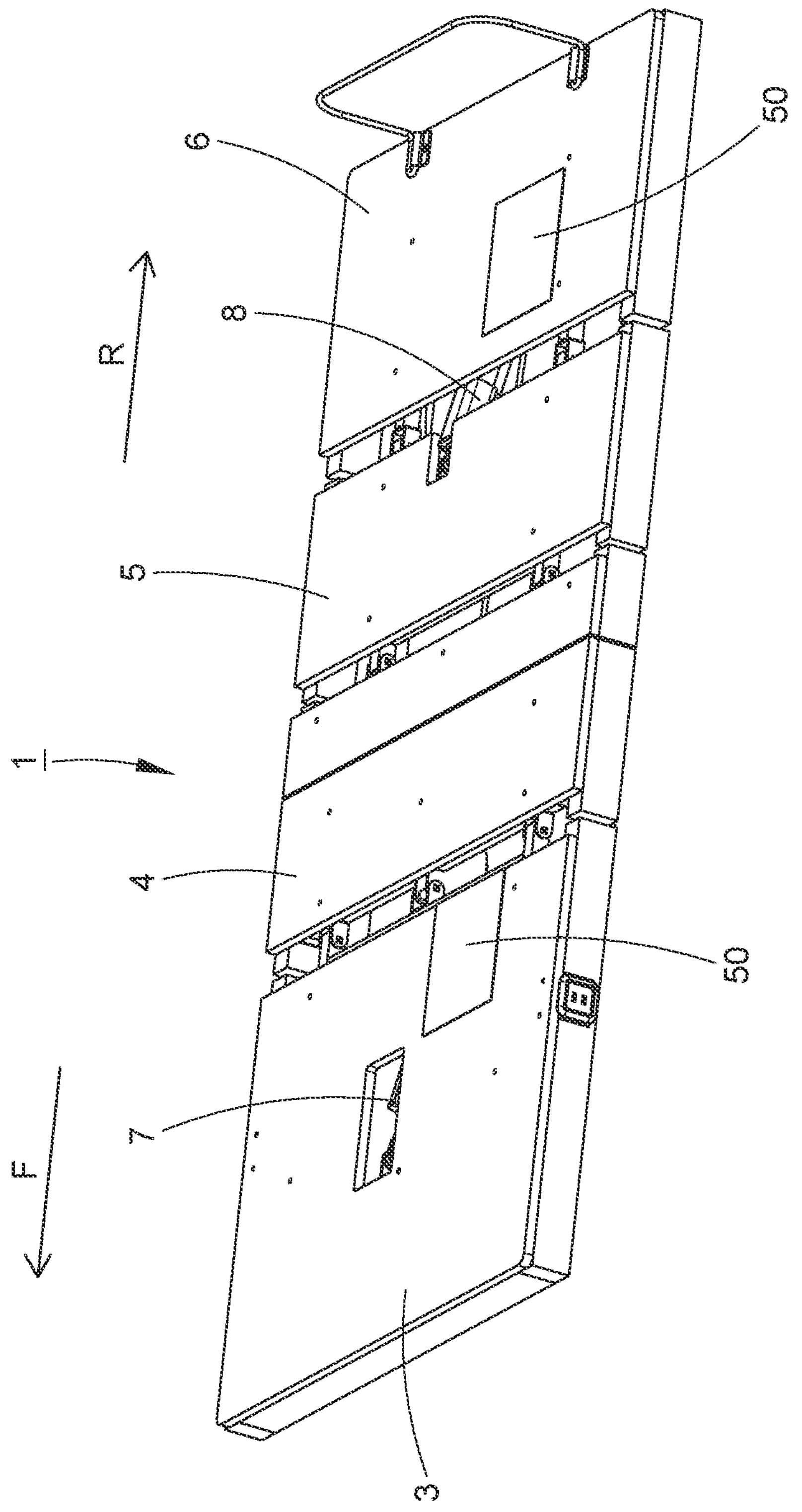
FIG. 1 is a top perspective view of an electric bed according to an embodiment of the present invention.
Figure 2:
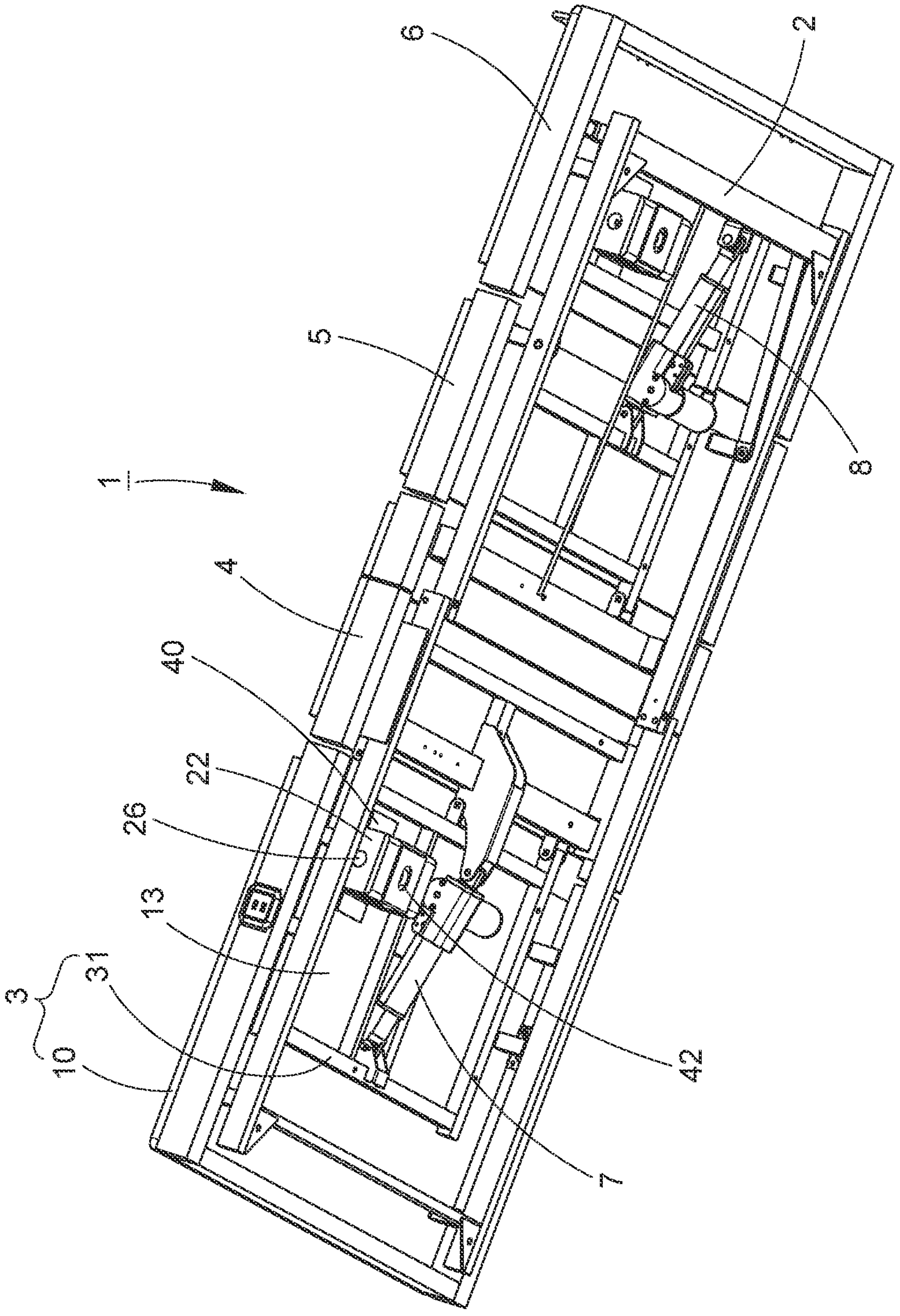
FIG. 2 is a bottom perspective view of the electric bed of the embodiment of the present invention.

The structure and technical features of the present invention will be detailedly described hereunder by an embodiment and accompany drawings. As shown in FIGS. 1-2, an electric bed 1 provided in accordance with an embodiment of the present invention comprises a base frame 2, a back supporting frame 3, a buttock supporting frame 4, a thigh supporting frame 5, a lower leg supporting frame 6, a front actuator 7, a rear actuator 8, and two vibrating motors 9.

The buttock supporting frame 4 is disposed on the base frame 2. The back supporting frame 3 is pivotally connected with a front end of the buttock supporting frame 4. In the present invention, the front direction is the direction towards the bead of the bed 1, which is denoted by reference character F in FIG. 1. The back direction or rear direction is the direction towards the tail of the bed 1, which is denoted by reference character R is FIG. 1. The thigh supporting frame 5 is pivotally connected with a rear end of the buttock supporting frame 4, and the lower leg supporting frame 6 is pivotally connected with a rear end of the thigh supporting frame 5. The front actuator 7 is pivotally connected between the buttock supporting frame 4 and the back supporting frame 3 in such a way that the back supporting frame 3 can be driven by the front actuator 7 to swing upwardly from the position shown in FIG. 1. The rear actuator 8 is pivotally connected between the base frame 2 and the thigh supporting frame 5 in such a way that the thigh supporting frame 5 can be driven by the rear actuator 8 to swing upwardly from the position shown in FIG. 1, and at the same time the lower leg supporting frame 6 will move upwardly along with the upward swing movement of the rear end of the thigh supporting frame 5. The two vibrating motors 9 are disposed to the back supporting frame 3 and the lower leg supporting frame 6, respectively. In another embodiment, the vibrating motors 9 can be disposed to other positions of the electric bed 1. Because the fixing structures of the two vibrating motors 9 are the same, the vibrating motor 9 disposed to the back supporting frame 3 will be taken as an example for illustration hereunder.

The back supporting frame 3 is composed of a skeleton 31 and a bed support 10, e.g., a planar or flat support surface. The bed support 10 is arranged on the top side of the skeleton 31 for supporting a mattress or a user's body. In this embodiment, the bed support 10 is a wood plate. However, the bed support 10 may be formed by a metal net, woven cloth, or other planar or flat members that can provide a support function. The skeleton 31 is pivotally connected with a front end of the front actuator 7. The bed support 10 has a rectangular hollow portion 12 penetrating therethrough.

Figure 3:
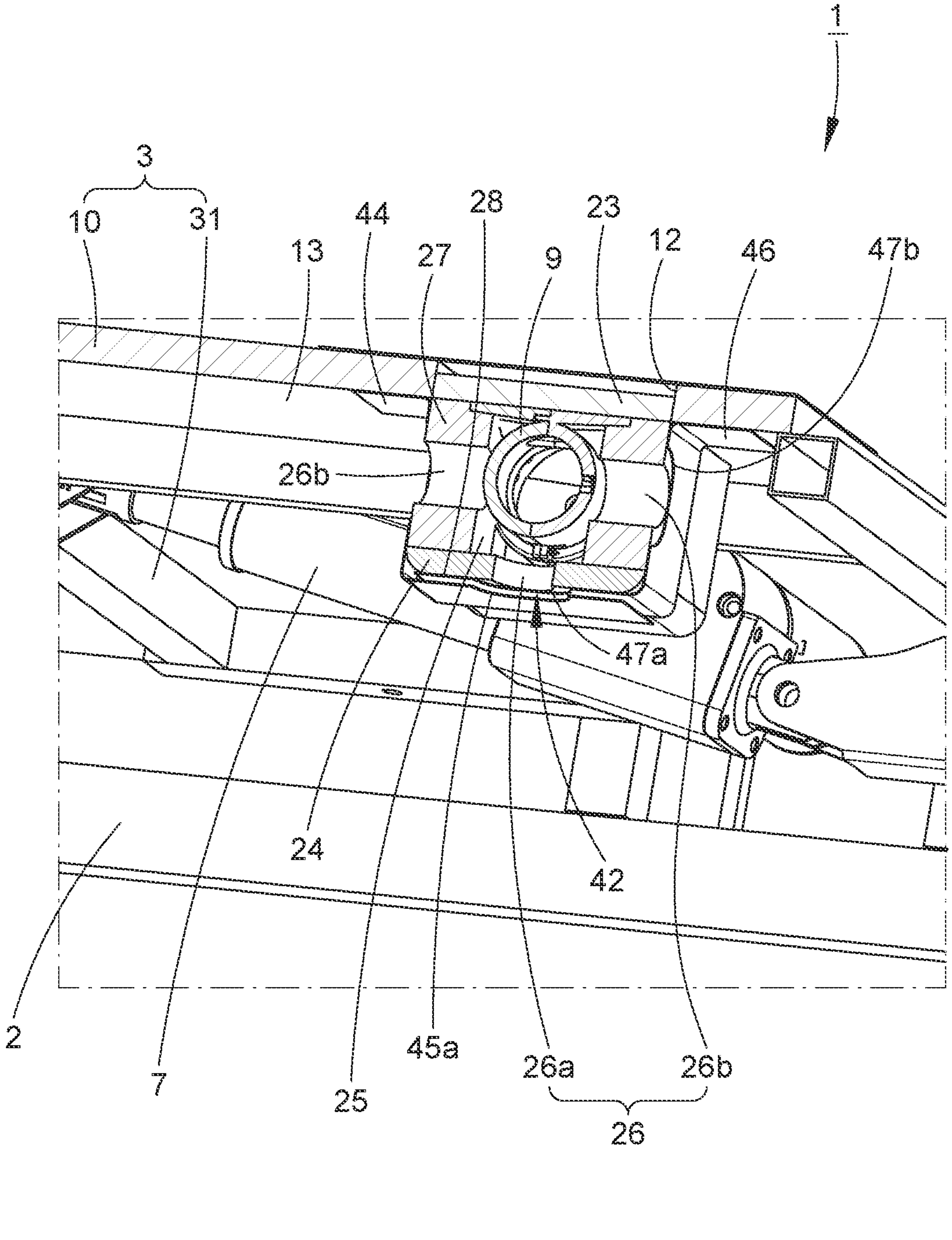
FIG. 3 is a cross-sectional view of a part of the electric bed of the embodiment of the present invention.
Figure 4:
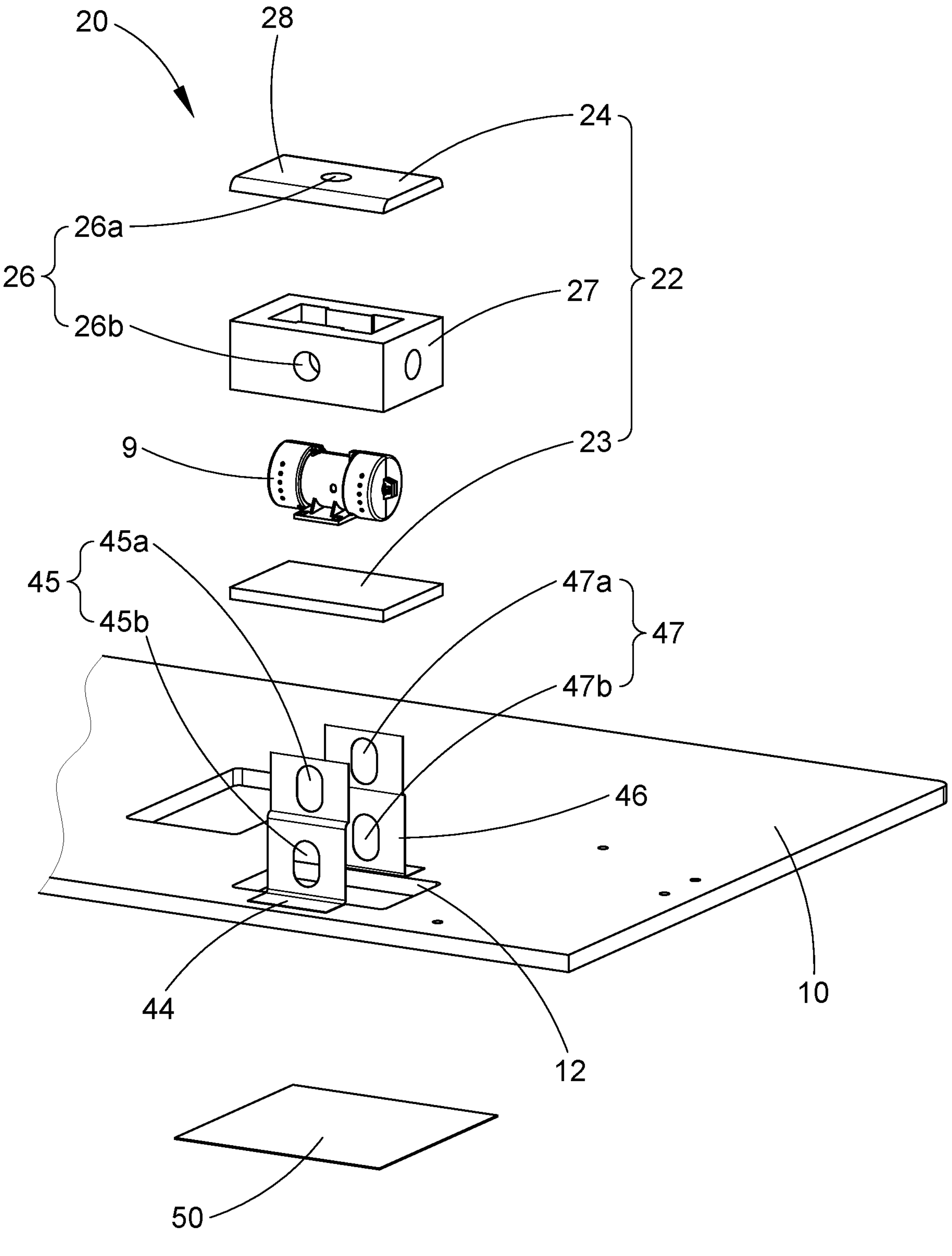
FIG. 4 is a partially exploded view of the electric bed of the embodiment of the present invention.

As shown in FIGS. 3 and 4, the electric bed 1 further comprises a cushion container 20, a retaining belt 40 and a sheltering member 50.

The cushion container 20 comprises a main body 22 having a top portion 23 received in the hollow portion 12, a chamber 25 provided inside the main body 22, and five first heat dissipating holes 26 communicated with the chamber 25 to an ambient environment. The cushion container 20 is made from a foam material, providing shock absorbing and impact buffering functions. In another embodiment, the cushion container 20 may be made from a rubber material, a silicon material, a polymer material, or other materials that can provide shock absorbing and impact buffering functions. The first heat dissipating holes 26 comprises the first heat dissipating holes 26*a* provided at the bottom wall 24 of the cushion container 20, and the first heat dissipating holes 26*b* provided at the lateral wall 27 of the cushion container 20. It is to be understood that the first heat dissipating holes 26 can be provided at any places of the cushion container 20.

The vibrating motor 9 is received in the chamber 25 of the cushion container 20. That is, the main body 22 of the cushion container 20 surrounds around the entire vibrating motor 9. However, in another embodiment, the main body 22 may surround only a part of the vibrating motor 9. For example, the top side of the vibrating motor 9 may be exposed outside the main body 22. The vibrating motor 9 can generate vibrations at predetermined frequencies and amplitudes to massage the user's body, and the cushion container 20 can absorb a part of the vibrations so as to prevent the bed support 10 from excessive shaking to cause discomfort to the user. In this embodiment, the main body 22 of the cushion container 20 is composed of the top portion 23, the bottom wall 24 and the lateral wall 27 of tubular shape. In manufacturing, the vibrating motor 9 is inserted into the lateral wall 27, and then the top portion 23, the bottom wall 24 and the lateral wall 27 are combined by adhesive. However, any modification to the aforesaid manufacturing way may be used.

The retaining belt 40 is mounted to the bottom side 13 of the bed support 10 and attached on (abutted against) a bottom edge 28 of the cushion container 20, such that the cushion container 20 is fixed to the bed support 10. The retaining belt 40 comprises a plurality of second heat dissipating holes 42 aimed at the first heat dissipating holes 26, i.e., corresponding in location to the first heat dissipating holes 26, such that the chamber 25 is communicated with the ambient environment through the first heat dissipating holes 26 and the second heat dissipating holes 42. As a result, the heat generated by the vibrating motor 9 during operation can be dissipated to the ambient environment and won't be accumulated inside the cushion container 20. In this way, the lifespan of the vibrating motor 9 may be prolonged, and the ageing or release of unpleasant odor of the foam material of the cushion container 20 may be prevented. The material and structure of the retaining belt 40 are not limited as long as it can fix the cushion container 20 and the vibrating motor 9. In this embodiment, the retaining belt 40 is composed of a male hook-and-loop fastener 44 and a female hook-and-loop fastener 46. The male hook-and-loop fastener 44 has two third heat dissipating holes 45, and the female hook-and-loop fastener 46 has two fourth heat dissipating holes 47. When the male and female hook-and-loop fasteners 44 and 46 are engaged together, a third heat dissipating hole 45*a* and a fourth heat dissipating hole 47*a* are overlapped to form a second heat dissipating hole 42. That is, the overlapping portion of the third and fourth heat dissipating holes 45*a* and 47*a*, which is located at the bottom edge 28 of the cushion container 20, forms the second heat dissipating hole 42. Furthermore, the other third heat dissipating hole 45*b*, which is regarded as a second heat dissipating hole 42 directly, is located at a location corresponding to one first heat dissipating hole 26*b*, and the other fourth heat dissipating hole 47*b*, which is regarded as a second heat dissipating hole 42 directly, is located at a location corresponding to the other first heat dissipating hole 26*b*. In this way, the retaining belt 40 can firmly fix the vibrating motor 9, and the retaining belt 40 itself has a simple structure, thereby achieving convenient assembly. Moreover, the retaining belt will not adversely affect the heat dissipation of the vibrating motor 9.

The sheltering member 50 is disposed to the bed support 10 and located above the cushion container 20. The sheltering member 50 is made from a fabric material. The sheltering member 50 is used to close the hollow portion 12 and limits the cushion container 20 to prevent the cushion container 20 from escape from the top side of the hollow portion 12. The sheltering member 50 provides a sheltering effect that prevents the hollow portion 12, the cushion container 20, and the vibrating motor 9 from being exposed outside, makes the surface of the bed support 10 more flat and easy to clean, and prevents foreign objects from falling into the hollow portion 12.

With the electric bed 1 of the present invention, the vibrating motor 9 can be firmly mounted by a simple way so as to achieve a convenient installation, and the heat generated by the vibrating motor 9 can be effectively dissipated from the cushion container 20 to an outside via the first, second, third and fourth heat dissipating holes 26, 42, 45 and 47 so as to enhance heat dissipation of the vibrating motor 9, thereby achieving the objectives of the present invention.

Based on the technical features of the present invention, various modifications to the electric bed 1 may be made. For example, the sheltering member 50 may be omitted, and the sheltering member 50 may be made from other materials other than fabric material. The numbers and positions of the first, second, third and fourth heat dissipating holes 26, 42, 45 and 47 may be changed. To enable the third and fourth heat dissipating holes 45 and 47 to be positively aimed at the first heat dissipating holes 26, the sizes of the third and fourth heat dissipating holes 45 and 47 may be designed to be larger than that of the first heat dissipating holes 26. For example, the first heat dissipating hole 26 may have a circular shape, and the third and fourth heat dissipating holes 45 and 47 may have an elongated or ellipse shape. Furthermore, the male and female hook-and-loop fasteners 44 and 46 may not be attached on the lateral wall 27 of the cushion container 20 but only attached on the bottom wall 24. Such variations are not to be regarded as a departure from the spirit and scope of the invention, and all such modifications as would be obvious to one skilled in the art are intended to be included within the scope of the following claims.

What is claimed is:

1. An electric bed, comprising:

a bed support having a hollow portion;

a cushion container including a main body having a top portion, a bottom portion, and a lateral wall between the top portion and the bottom portion, wherein the top portion is received in the hollow portion, a chamber provided inside the main body, and at least one first heat dissipating hole extending through the lateral wall of the cushion container from an interior surface of the lateral wall to an exterior surface of the lateral wall and communicated with the chamber to an ambient environment;

a vibrating motor disposed in the chamber of the cushion container; and a retaining belt disposed with the bed support and attached on the bottom edge of the cushion container to fix the cushion container to the bed support, wherein the retaining belt comprises a first end forming a first opening and a second end forming a second opening, wherein the first and second openings are spaced apart to receive the cushion container and at least one second heat dissipating hole is formed on the retaining belt between the first and second ends, wherein the at least one second heat dissipating hole is aimed at the at least one first heat dissipating hole of the lateral wall, such that the chamber is communicated with the ambient environment through the at least one first and second heat dissipating holes.

2. The electric bed as claimed in claim 1, wherein the retaining belt comprises a male hook-and-loop fastener having a third heat dissipating hole, and a female hook-and-loop fastener having a fourth heat dissipating hole; when the male and female hook-and-loop fasteners are engaged together, the third and fourth heat dissipating holes are overlapped to form the at least one second heat dissipating hole.

3. The electric bed as claimed in claim 1, wherein the cushion container is made from a foam material, a rubber material, a silicon material, or a polymer material.

4. The electric bed as claimed in claim 1, further comprising a sheltering member disposed to the bed support and located above the cushion container.

5. The electric bed as claimed in claim 4, wherein the sheltering member is made from a fabric material.

* * * * *